(12) United States Patent
Desiron

(10) Patent No.: US 8,677,606 B2
(45) Date of Patent: Mar. 25, 2014

(54) METHOD FOR ASSEMBLING A ROTOR WITH PERMANENT MAGNETS

(75) Inventor: Andries Jan F. Desiron, Edegem (BE)

(73) Assignee: Atlas Copco Airpower, Naamloze Vennootschap, Wilrijk (BE)

( * ) Notice: Subject to any disclaimer, the term of this patent is extended or adjusted under 35 U.S.C. 154(b) by 22 days.

(21) Appl. No.: 13/318,520

(22) PCT Filed: Aug. 24, 2010

(86) PCT No.: PCT/BE2010/000059
§ 371 (c)(1),
(2), (4) Date: Nov. 2, 2011

(87) PCT Pub. No.: WO2011/029162
PCT Pub. Date: Mar. 17, 2011

(65) Prior Publication Data
US 2012/0049683 A1    Mar. 1, 2012

(30) Foreign Application Priority Data

Sep. 10, 2009   (BE) .................................. 2009/0553

(51) Int. Cl.
*H02K 15/03*     (2006.01)
(52) U.S. Cl.
USPC ........................................ 29/598; 310/156.01
(58) Field of Classification Search
CPC .............................. H01F 41/048; H02K 15/03
USPC ........................................ 29/598; 310/156.01
See application file for complete search history.

(56) References Cited

U.S. PATENT DOCUMENTS

| 5,581,140 A | 12/1996 | Futami et al. |
| 2005/0210663 A1* | 9/2005 | Ishida et al. ..................... 29/732 |
| 2007/0205686 A1* | 9/2007 | Ishida ....................... 310/156.21 |

FOREIGN PATENT DOCUMENTS

| DE | 102007014192 | 6/2008 |
| EP | 0552365 | 7/1993 |
| EP | 1947758 | 7/2008 |
| JP | 2000324737 | 11/2000 |
| JP | 2008199698 | 8/2008 |
| JP | 200944819 | 2/2009 |
| WO | 2005043741 | 5/2005 |
| WO | 2008007679 | 1/2008 |
| WO | 2008064969 | 6/2008 |

OTHER PUBLICATIONS

International Search Report and Written Opinion in PCT/BE2010/000059, Mar. 10, 2011.

* cited by examiner

*Primary Examiner* — Livius R Cazan
(74) *Attorney, Agent, or Firm* — Bacon & Thomas, PLLC

(57) ABSTRACT

Method for assembling a rotor with permanent magnets, including the steps of introducing the magnets in 10 recesses of a non-ferromagnetic holder; combining the holder and the permanent magnets with a non-ferromagnetic support plate; attaching the permanent magnets to the support plate; and removing the holder and providing lamellae over the permanent magnets attached to the support plate. A holder and rotor obtained by the method are described.

11 Claims, 4 Drawing Sheets

METHOD FOR ASSEMBLING A ROTOR WITH PERMANENT MAGNETS

BACKGROUND OF THE INVENTION

1. Field of the Invention

The present invention relates to a method for assembling a rotor with permanent magnets, a holder applied thereby, and a rotor obtained by such a method.

2. Related Art

More specifically, the invention is intended for assembling such a rotor for use in interior permanent magnet motors (IPM).

In standard induction motors the rotor is composed of ferromagnetic lamellae, which are held together by a cage, usually made by injection moulding.

Motors with a laminated rotor are also known, whereby permanent magnets are positioned in ferromagnetic lamellae, and which motors, as result thereof, do not have a cage and require another way of compressing and holding the lamellae together.

It is known that when assembling this last type of motor the lamellae are first joined together in a stack and are mutually attached, for which different methods are already known.

For instance, it is possible to punch the lamellae to each other, or even to attach them to each other by means of rivets or welded joints.

A disadvantage of this method is that the local connections between the isolated lamellae result in a reduced performance of the motor, since they have a negative influence on the iron losses induced by the magnetic field.

A possible solution is the use of adhesives to connect these lamellae to each other. A disadvantage is that when sticking the lamellae together by means of adhesives, this method is expensive and sensitive to temperature.

Another disadvantage is that it is difficult to introduce the permanent magnets in recesses provided for this purpose in the lamellae that are already joined together. The permanent magnets exert high forces on the ferromagnetic lamellae and on the other magnets already positioned in place as a result of which they do not remain automatically on their position.

Another disadvantage of the lamellae that have already been joined is the possibility to make mistakes by mounting the magnets in an incorrect orientation in the recesses provided for this purpose, more specifically with the north-south direction of the magnets opposite to the intended north-south direction.

It is known that this incorrect orientation can be avoided by mounting the magnets in non-magnetised state in the rotor and magnetize them afterwards, together with the whole rotor, but this way of magnetising has the disadvantage of involving a high energy requirement.

BRIEF SUMMARY OF THE INVENTION

The present invention aims to offer a solution to one or more of the above-mentioned and/or other disadvantages, by providing a method for assembling a rotor with permanent magnets, which method comprises the following steps:
  introducing the magnets into recesses of a non-ferromagnetic holder;
  assembling the holder and the permanent magnets with a non-ferromagnetic support plate;
  attaching the permanent magnets to the support plate; and
  removing the holder and providing lamellae over the permanent magnets attached to the support plate.

According to a preferred characteristic of the invention this method comprises the following steps:
  assembling two support plates with permanent magnets attached thereto,
  introducing a rotor axis through a first support plate;
  stacking lamellae over said rotor axis to cover said magnets completely;
  further building the stack with additional lamellae which could contain the magnets of the second support plate, by moving this second support plate over the rotor axis with its permanent magnets directed towards the first support plate; and
  attaching the two support plates to the rotor axis.

Preferably, attachment of the two support plates is achieved by axially compressing the two support plates with the lamellae situated in between, and blocking the support plates on the rotor axis in axial direction.

For example, the two support plates can be axially compressed on the rotor axis by way of a circlip, a safety ring, a bolt, a clamp ring or another clamping part.

An advantage of this method is that the lamellae are compressed by the aforementioned support plates, without having made any connection between one lamella and another, which is favourable to the good working of the motor.

Another advantage of this method is that the lamellae are firmly anchored, and are not moveable, which is not only favorable for the good working of the motor, but also prevents annoying noises would be produced.

Preferably, during the assembly according to the method of the invention, the support plates, the lamellae and the rotor axis are aligned, preferably in the direction of rotation around the rotation axis.

Preferably the support plates and the lamellae are provided with a passage for a rotor axis, which passage is provided with a recess that fits over a keyway which extends along the axial direction of the rotor axis, such that the support plates and the lamellae are held in a non-rotatable and axially aligned position.

Preferably, the attachment of the permanent magnets to the non-ferromagnetic support plate according to the method is done by glueing, whereby the adhesive can be an adhesive that hardens as under influence of applied pressure.

Preferably, the support plate is placed on a ferromagnetic underground during assembly in order to exert a pressure between the permanent magnets and the support plate due to the magnetic attraction of the permanent magnets on the ferromagnetic underground, during attachment of the magnets to the support plate by means of glueing.

Preferably, the non-ferromagnetic holder is provided with at least one magnet that, in case of incorrect introduction of the permanent magnets of the rotor in the holder, is able to repel or stop the concerning permanent magnet in axial direction.

Preferably, the aforementioned magnet of the holder is positioned opposite to a recess in the holder for a permanent magnet of the rotor, and this at a distance from the entry of the aforementioned recess along which the permanent magnet of the rotor is introduced into the holder.

An advantage of this method is that incorrect introduction of permanent magnets is prevented during assembling a rotor.

DESCRIPTION OF THE DRAWINGS

In order to show more clearly the aspects of the invention, a preferred embodiment of a method according to the invention for assembling a rotor with permanent magnets is described hereunder, with reference to the accompanying drawings, by way of example without having any limiting character, in which.

DETAILED DESCRIPTION OF PREFERRED EMBODIMENTS OF THE INVENTION

Figure 1:
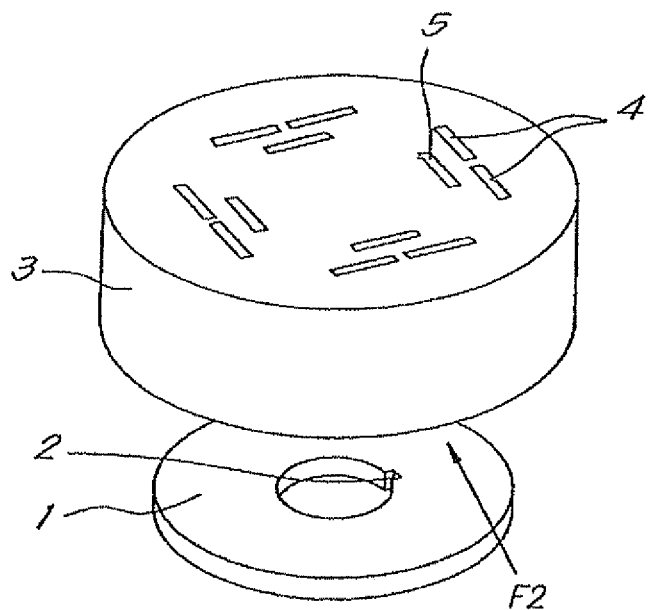
FIG. 1 represents schematically and in perspective view a non-ferromagnetic support plate and holder according to the invention.

FIG. 1 shows a non-ferromagnetic support plate 1 which in this example is disc-shaped and demonstrates a preferably centrally located, through, round hole, as well as a recess 2 that in this case consists of a notch in the circumferential wall of the said central hole.

On the aforementioned support plate 1 a non-ferromagnetic holder 3 can be placed, whereby in this case said holder 3 shows also a disc-shape and whereby this holder 3 is provided with recesses 4 extending in the axial direction and which, in this case, continue through the entire thickness of the holder 3, and with recesses 5 which, in this case, only continue up to the half of the depth of the holder.

Figure 2:
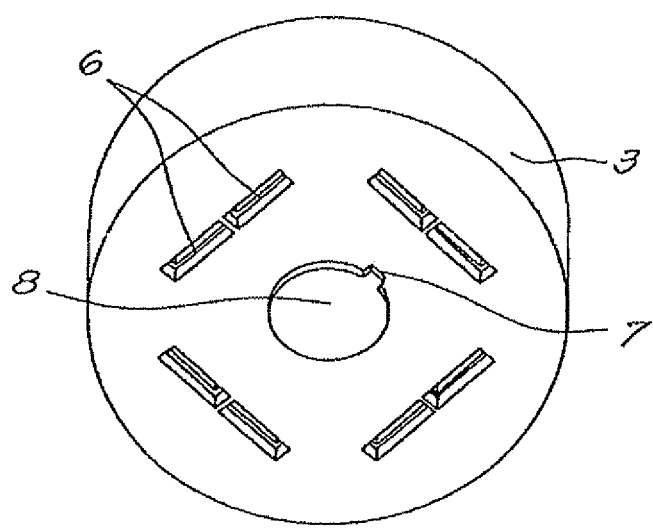
FIG. 2 represents a view according to arrow F2 of the holder in FIG. 1.

As represented in FIG. 2 the exits 6 of the recesses 4 through the holder 3 are visible on one axial end of the holder 3, which exits 6 are widened towards the end plane of the concerning axial end.

The concerning end plane is also provided with a keyway 7 which together with a disc-shaped protuberance 8 on this end plane fits as a key to the central hole with the recess 2 of the support plate 1 from FIG. 1.

Figure 3:
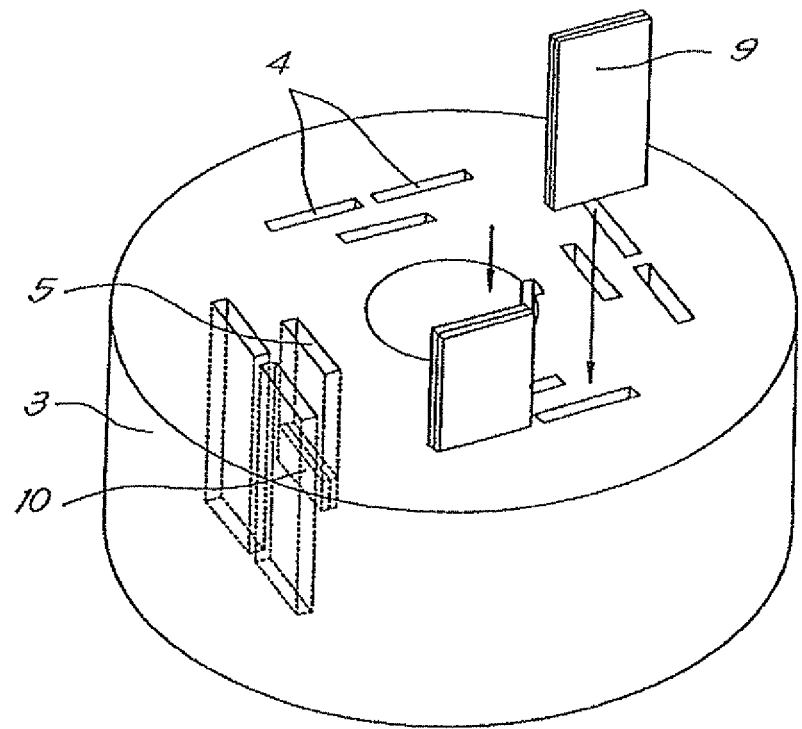
FIG. 3 represents the positioning of permanent magnets on the support plate in the holder.

FIG. 3 represents the positioning of permanent magnets 9 that fit into the recesses 4 provided for this purpose in the holder 3, and the position of magnets 10 in the recesses 5 of half depth provided to that end.

Each permanent magnet 9 is provided with a magnetic south plane, designated by the letter S, and with a magnetic north plane, designated by the letter N. The smaller magnets 10 also have a S and a N side.

Figure 4:
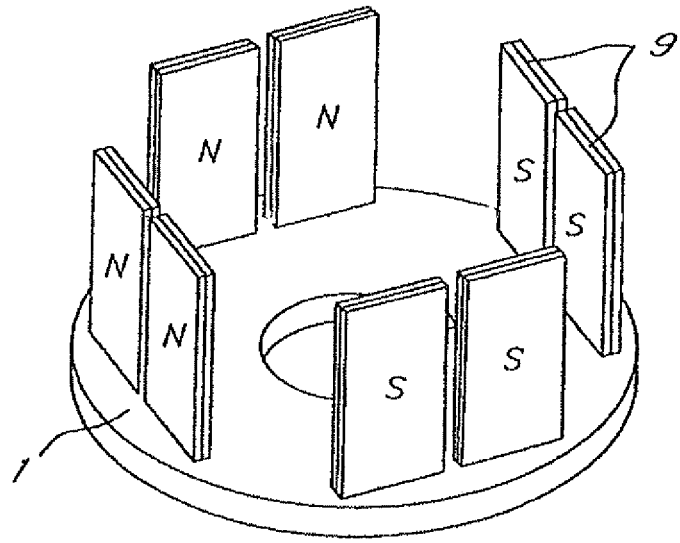
FIG. 4 represents a support plate to which are attached permanent magnets according to the invention.

In FIG. 4 a support plate 1 is represented to which all permanent magnets 9 are attached in the desired position.

Figure 5:
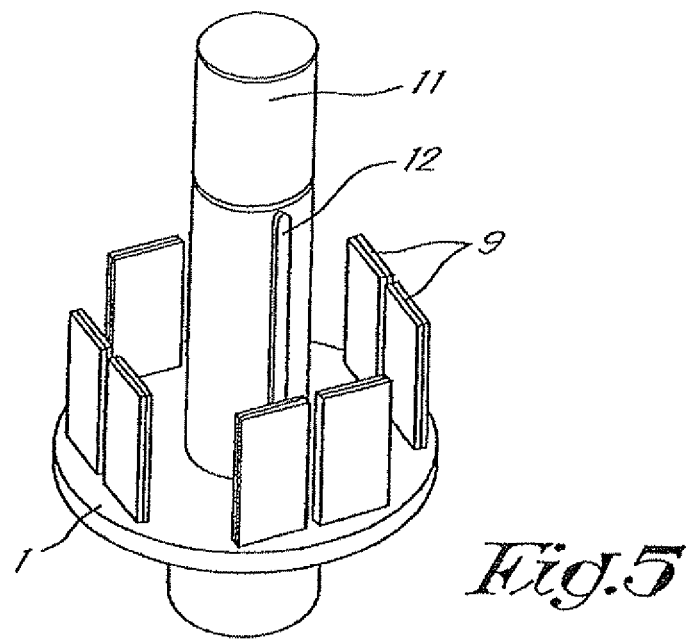
FIG. 5 represents the assembly of FIG. 4 on a rotor axis.

FIG. 5 shows the assembly of a support plate 1 with permanent magnets 6 on a rotor axis 11 provided with a keyway 12 cooperating with the recess 2 of the support plate 1.

Figure 6:
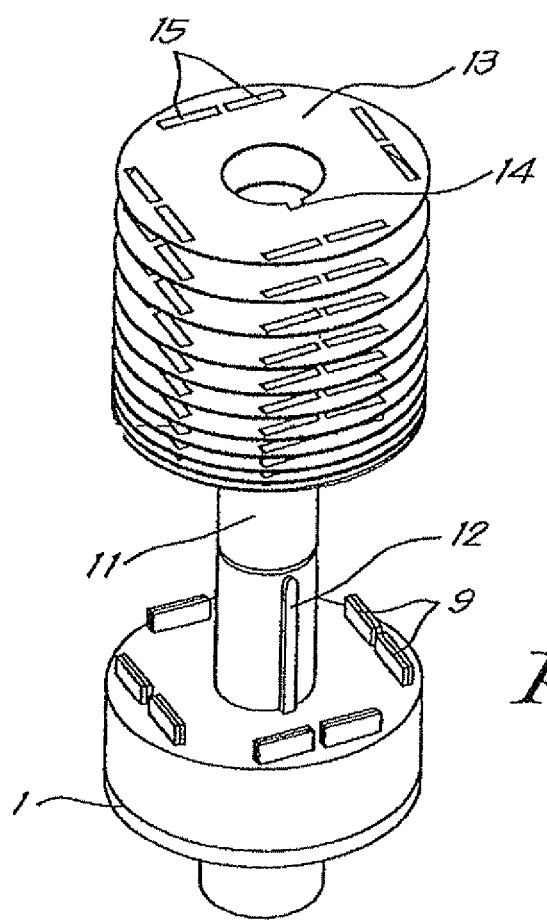
FIG. 6 represents the assembly of ferromagnetic lamellae on the rotor axis of FIG. 5.

FIG. 6 shows the stacking of the ferromagnetic lamellae 13 onto a rotor axis 11 provided with a keyway 12, whereby the ferromagnetic lamellae 13 are provided with a recess 14 fitting over the keyway 12 of the rotor axis 11, and with recesses 15 which fit around the permanent magnets 9.

Figure 7:
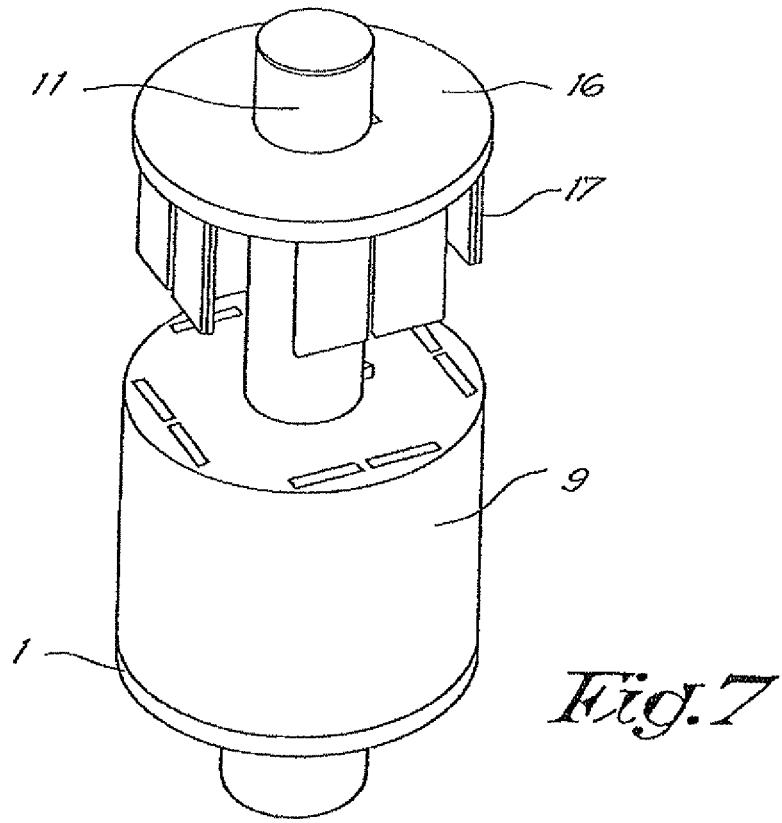
FIG. 7 represents the assembly of a second support plate to which permanent magnets are attached, to the rotor axis but now in an opposite manner.

FIG. 7 shows the assembly of a second support plate 16 to which permanent magnets 17 are attached by moving this second plate 16 over the rotor axis in the opposite direction from the first support plate 1.

Figure 8:
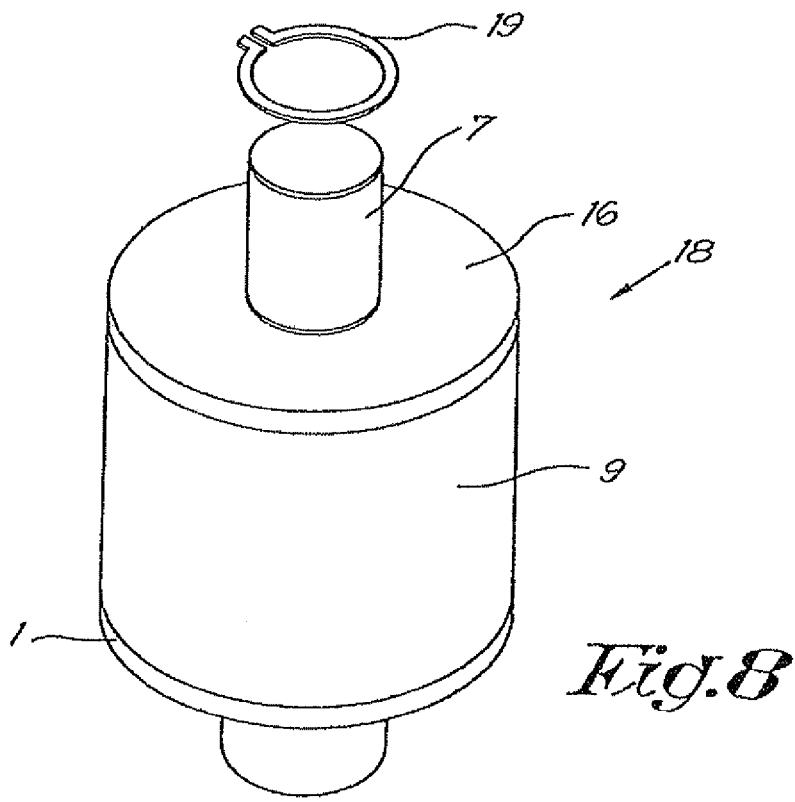
FIG. 8 represents the assembled rotor according to the invention.

FIG. 8 represents a rotor 18 as assembled according to the invention, limited by a upper support plate 16, and a lower support plate 1, in between which stacked lamellae 13 are situated, which lamellae 13 are compressed by both support plates 1 and 16 under influence of a circlip 19.

The method for assembling an electromagnetic rotor is very easy and as follows.

The disc-shaped support plate 1, from a non-ferromagnetic material, is positioned on top of a ferromagnetic surface and the upper side is sprayed with activator for an adhesive.

The holder 3, also from a non-ferromagnetic material such as aluminium, is positioned on top of the support plate 1 whereby the holder 3 by means of a disc-shaped protuberance 8, provided with a keyway 7, fits like a key in the central hole of the support plate 1 which is provided with a fitting recess 2 for the keyway 7, such that a correct positioning is obtained.

The smaller magnets 10 are introduced in the half recesses that are provided to that end and anchored, which only continue till half of the depth of the holder 3.

The larger permanent magnets 9 are provided with a layer of adhesive on their lower side and each one is moved into the recesses 4 continuing through the whole thickness of the holder 3 provided to that end, whereby the permanent magnet 9 is attracted by the magnetisable platform, whereupon the support plate 1 is resting, and is shifted till against the support plate 1, whereby the adhesion is initiated by the pressure of the magnetic attraction as a result of the contact of the activator and the adhesive.

This movement can only be successful if the orientation of the introduced permanent magnet 9 is appropriate. If not, the permanent magnet 9 will be repelled by the small magnet 5 towards the upper surface, so as to prevent that permanent magnets 9 can be mounted in the rotor in the incorrect magnetic orientation.

The adhesive solely hardens at the contact surface between permanent magnet 9 and the support plate 1. The recesses, in which the permanent magnets fit into the holder, are locally widened at the bottom 6, such that any potential excess of adhesive will find its way out, however without hardening. By introducing lamellae 13 in a further step, the excess of adhesive will be distributed over the entire lamella 13, whereby it is prevented that the surface of the lamella 13 would not be perfectly joined to the surface of the support plate 1.

After all permanent magnets 9 have been introduced and the adhesive has hardened, the holder 3 is removed, and the method will be repeated once more for a second support plate 16.

The assembly of the rotor is continued by moving the first support plate 1 with fixed permanent magnets 9 along the rotor axis 11, whereby the keyway 12 on the rotor axis 11 allows the correct positioning by means of the corresponding recess 2 in the first support plate 1.

Subsequently, all lamellae 13 are shifted on the axis, whereby the keyway 12 on the rotor axis 11 again enables a correct positioning of the lamellae 13.

Finally, the second support plate 16, provided with attached permanent magnets 17, is shifted along the rotor axis 11, however in the opposite sense, such that the attached permanent magnets 17 now point downwards.

In this way a rotor is obtained that is provided with permanent magnets 9 and 17 that are enclosed by a stack of lamellae 13, which stack is limited by an upper and a lower support plate, 1 and 16, that are compressed by an attachment means, such as a circlip 18 or the like, whereby the lamellae 13 make good contact, but without being connected to each other.

Obviously, the attachment means can also consist of a screw bolt or a heat-shrink tubing placed on the rotor axis, or of another mechanic attachment means.

It is also obvious that the permanent magnets can also be attached to the support plates by other means than by adhesives.

Furthermore, it is obvious that the method is not limited to the interconnection of two identical support plates provided with permanent magnets, but that also just one, or more than two support plates with permanent magnets can be used for the assembly of a rotor according to the invention.

The present invention is by no means limited to the embodiment as described by way of example and as shown in the figures, however a method according to the invention for assembling a rotor with permanent magnets, a holder applied thereby and a rotor obtained by such a method, can be realized according to different variants without departing from the scope of the invention.

The invention claimed is:

1. A method for assembling a rotor with permanent magnets, comprising the steps:
    introducing a first set of permanent magnets into recesses of a first non-ferromagnetic holder;
    combining the first holder and the first set of permanent magnets with a first non-ferromagnetic support plate;
    attaching the first set of permanent magnets to the first support plate; and
    removing the first holder and providing lamellae over the first set of permanent magnets attached to the first support plate.

2. The method according to claim 1, including:
    providing a second support plate to which a second set of permanent magnets are attached;
    introducing a rotor axis through the first support plate, wherein the lamellae over the first set of permanent magnets are provided around said rotor axis so as to cover said magnets completely;
    further stacking additional lamellae around said rotor axis by shifting the second support plate along the rotor axis with its attached permanent magnets directed towards the first support plate; and
    attaching the first and second support plates to the rotor axis.

3. The method according to claim 2, wherein the attachment of the first and second support plates is carried out by axially compressing the support plates with the lamellae located in between, and by blocking the support plates on the rotor axis in an axial direction.

4. The method according to claim 3, wherein the axial compressing of the two support plates on the rotor axis is carried out by using a clamping part.

5. The method according to claim 2, wherein, during assembly of the support plates, the lamellae, and the rotor axis are aligned to each other around an axis of rotation of the rotor axis along the direction of rotation.

6. The method according to claim 5, including providing the support plates and the lamellae with a hole for the rotor axis, which hole is provided with a recess which fits over a keyway extending along an axial direction of the rotor axis, such that the support plates and the lamellae are held in a non-rotatable and axially aligned position.

7. The method according to claim 2, wherein the attachment of the first or second permanent magnets on the first or second support plate is carried out by gluing.

8. The method according to claim 7, wherein an adhesive for attachment of the permanent magnets comprises an adhesive which hardens under the influence of applied pressure.

9. The method according to claim 8, wherein, during assembling, the first or second support plate is positioned on a ferromagnetic underground, in order to apply a pressure between the respective first or second set of permanent magnets and the first or second support plate through magnetic attraction of the permanent magnets to the ferromagnetic underground, during the attachment of the magnets to the support plate by gluing.

10. The method according to claim 2, including providing the non-ferromagnetic holder with at least one magnet which, in case of an incorrect introduction of a permanent magnet in the holder, repels or stops, in an axial direction of the rotor, the permanent magnet.

11. The method according to claim 10, including positioning the magnet of the holder opposite a recess in the holder for receiving a permanent magnet of the rotor at a distance from the entry of said recess along which the permanent magnet of the rotor is introduced into the holder.

* * * * *